United States Patent
Parellada Armela et al.

(10) Patent No.: US 11,027,566 B2
(45) Date of Patent: Jun. 8, 2021

(54) INSTALLING PRINTED MEDIA

(71) Applicant: Velcro IP Holdings LLC, Machester, NH (US)

(72) Inventors: Luis Parellada Armela, Barcelona (ES); Carlos Sáez Comet, Barcelona (ES)

(73) Assignee: Velcro IP Holdings LLC, Manchester, NH (US)

( * ) Notice: Subject to any disclaimer, the term of this patent is extended or adjusted under 35 U.S.C. 154(b) by 939 days.

(21) Appl. No.: 15/068,802

(22) Filed: Mar. 14, 2016

(65) Prior Publication Data

US 2017/0259603 A1    Sep. 14, 2017

(51) Int. Cl.
| | |
|---|---|
| *B41M 5/50* | (2006.01) |
| *F16B 1/00* | (2006.01) |
| *G09F 19/22* | (2006.01) |
| *G09F 15/00* | (2006.01) |
| *G09F 7/18* | (2006.01) |
| *G09F 7/12* | (2006.01) |
| *A44B 18/00* | (2006.01) |

(52) U.S. Cl.
CPC .............. *B41M 5/504* (2013.01); *F16B 1/00* (2013.01); *G09F 7/12* (2013.01); *G09F 7/18* (2013.01); *G09F 15/00* (2013.01); *G09F 15/0025* (2013.01); *G09F 19/22* (2013.01); *A44B 18/00* (2013.01); *F16B 2001/0028* (2013.01)

(58) Field of Classification Search
CPC ............ B41M 5/504; F16B 1/00; G09F 15/00
See application file for complete search history.

(56) References Cited

U.S. PATENT DOCUMENTS

| | | | |
|---|---|---|---|
| 4,775,310 A | 10/1988 | Fischer | |
| 6,131,251 A | 10/2000 | Provost | |
| 6,329,016 B1 | 12/2001 | Shepard et al. | |
| 8,176,664 B2 | 5/2012 | Delmotte et al. | |
| 2002/0022108 A1* | 2/2002 | Krantz | A44B 18/0049 428/100 |
| 2004/0058121 A1 | 3/2004 | Schriefer et al. | |
| 2004/0067342 A1* | 4/2004 | Shepard | A44B 18/0011 428/182 |
| 2004/0099020 A1 | 5/2004 | Sasser et al. | |

(Continued)

FOREIGN PATENT DOCUMENTS

| | | |
|---|---|---|
| CN | 1249051 | 3/2000 |
| CN | 1325354 | 12/2001 |

(Continued)

OTHER PUBLICATIONS

Velcro Brand_2015 US Product line Brochure, p. 66.*

(Continued)

*Primary Examiner* — Samir Shah
*Assistant Examiner* — Tong Guo
(74) *Attorney, Agent, or Firm* — Fish & Richardson P.C.

(57) ABSTRACT

A printed media display system includes a media mounting surface carrying discrete male touch fastening elements arranged in a field extending across the surface, and print media in the form of a flexible sheet having a fastening side and a print side, the fastening side featuring engageable fibers in a fibrous field extending across a length and width of the flexible sheet. The system exhibits particularly good wrinkle propagation and engaged alignment properties.

20 Claims, 14 Drawing Sheets

(56) References Cited

U.S. PATENT DOCUMENTS

| | | | |
|---|---|---|---|
| 2005/0074740 A1 | 4/2005 | Armstrong | |
| 2005/0112493 A1* | 5/2005 | Shimomura | B41M 5/345 430/211 |
| 2005/0181352 A1* | 8/2005 | Shephard | A01K 5/0114 434/428 |
| 2006/0019055 A1 | 1/2006 | Lester, Jr. et al. | |
| 2010/0158546 A1* | 6/2010 | No | G03G 15/2064 399/16 |
| 2013/0008133 A1 | 1/2013 | Kraus et al. | |
| 2016/0345686 A1 | 12/2016 | Clarner et al. | |

FOREIGN PATENT DOCUMENTS

| | | |
|---|---|---|
| CN | 1685385 | 10/2005 |
| CN | 1764537 | 4/2006 |
| CN | 101631905 | 1/2010 |
| CN | 1684599 | 4/2011 |
| CN | 102560831 | 7/2011 |
| CN | 202339471 | 7/2012 |
| CN | 103104084 | 5/2013 |
| EP | 2286404 | 4/2016 |
| JP | 2003125813 | 5/2003 |
| JP | 2004194730 | 7/2004 |
| JP | 2007-151663 | 6/2007 |
| WO | 2004/019305 | 3/2004 |

OTHER PUBLICATIONS

ASTM Designation: D 5169-98, "Standard Test Method for Shear Strength (Dynamic Method) of Hook and Loop Touch Fasteners," 1999, pp. 689-691.

ASTM Designation: D 5170-98, "Standard Test Method for Peel Strength ("T" Method) of Hook and Loop Touch Fasteners," 1999, pp. 692-695.

Invitation to Pay Additional Fees in International Application No. PCT/EP2017/050018, dated Mar. 16, 2017, 7 pages.

Kovacs et al., "Biodegradable polymers based on starch and poly (lactic acid)," SPE Plastics ResearchOnline, Mar. 2011, 10.2417/spepro. 003613.

Lahey, "Modelling Hysteresis in the Bending of Fabrics," University of Waterloo, Ontario, Canada, 2002, 133 pages.

Leung et al., "Relationships between Fabric Formability, Bias Extension and Shear Behaviour of Outerwear Materials," RJTA, 2000, 4(2):10-23.

PSA Peugeot-Citroen, "Methodes d'essai materiaux: Revetements De Sol Textiles Et Enduits Souplesse (Material Testing Methods: Flooring Textiles and Coatings Flexibility)," D45 1348, 2003, 6 pages.

International Search Report and Written Opinion in International Application No. PCT/EP2017/050018, dated May 16, 2017, 19 pages.

* cited by examiner

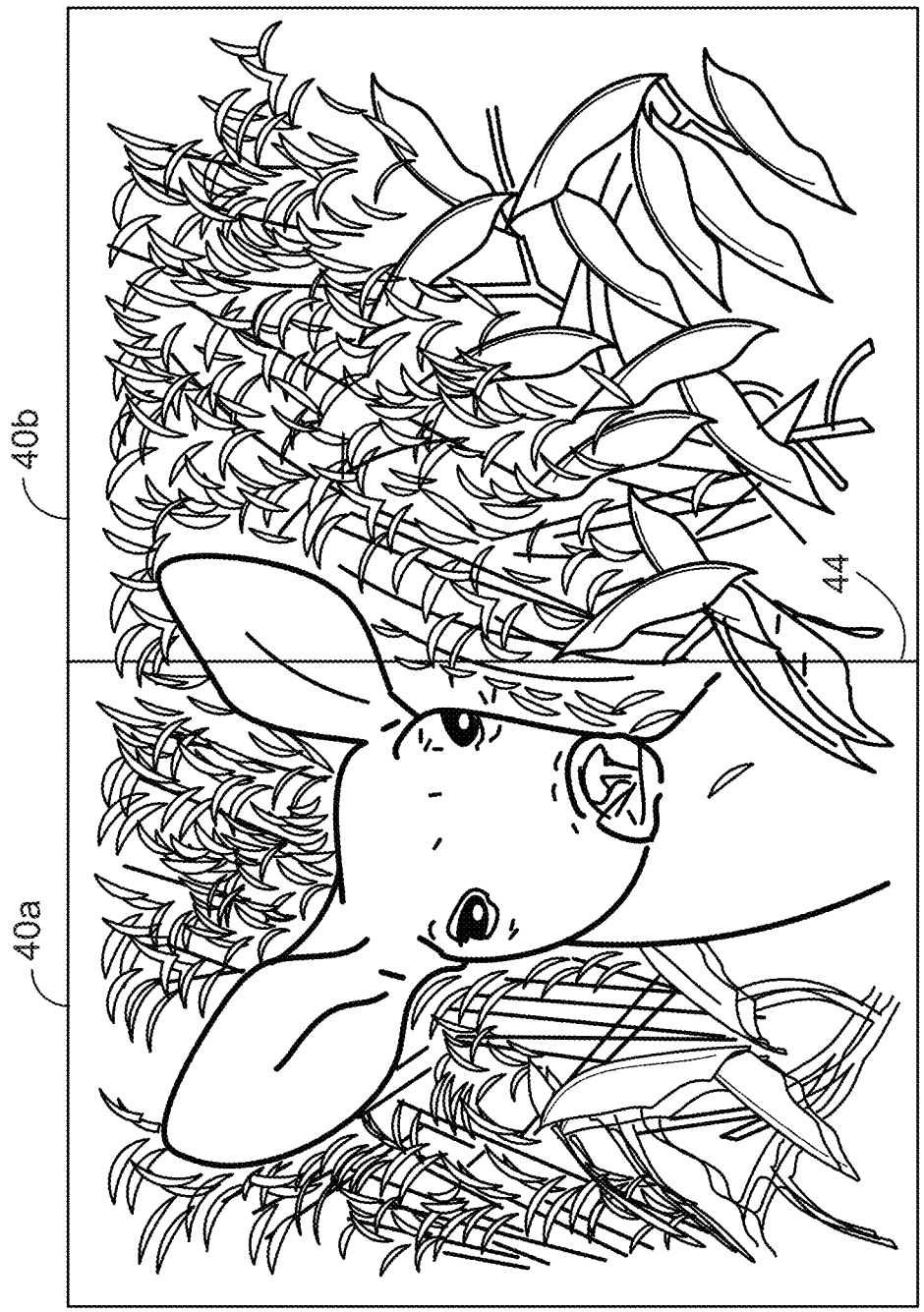

INSTALLING PRINTED MEDIA

TECHNICAL FIELD

This invention relates to display systems involving hook and loop fastening, and to methods of installing printed media.

BACKGROUND

Informational and decorative displays are often applied to walls and other surfaces. In many contexts it is desirable to change them seasonally, without damage to the underlying surface. Sometimes these displays are applied as multiple sheets of printed media, installed with aligned edges to form a continuous image across the sheets. Such sheets may be formed of a vinyl material and applied by known methods to a smooth surface such as a window or the side of a vehicle, for example.

For ease of installation and removal it has been suggested to secure such display sheets by hook and loop engagement, such as by covering a wall surface with an engageable fibrous material and providing male touch fastener elements on the back surface of each sheet.

The invention focuses on improvements to display systems involving hook and loop fastening.

SUMMARY

According to one aspect of the invention, a printed media display system includes a media mounting surface carrying discrete male touch fastening elements arranged in a field extending across the surface (such as with each male touch fastening element having a stem projecting outward and supporting a fiber-engageable head), and print media in the form of a flexible sheet having a fastening side and a print side, the fastening side featuring engageable fibers in a fibrous field extending across a length and width of the flexible sheet, such that the fastening side of the print media is releasably engageable with the media mounting surface so as to display the print side. The media mounting surface and the fastening side of the print media together form a releasable fastening having a Peel Strength, as determined by ASTM D 5170-98 (integrator average method, using only the data between 50 and 175 mm of head travel). The flexible sheet has a Bending Rigidity, as determined by standard test D45 1348 (as described below). Notably, the Peel Strength and Bending Rigidity are related such that the print media display system has a Wrinkle Propagation Coefficient of between 10 and 30.

We have defined Wrinkle Propagation Coefficient (WPC) to be the Bending Rigidity divided by the Peel Strength (both measured over the same width of media and fastening, and having identical units, such as Newtons). In some cases, the WPC is between 12 and 25, and in some particular cases is between 15 and 25.

For some applications, the print media preferably also exhibits a Small Deformation Shear Hysteresis (SDSH) of less than negative 40 grams force per centimeter. By 'less than negative' we mean that the absolute value of the SDSH is greater than 40 and is less than zero.

The Bending Rigidity, in some embodiments, is preferably between 3.5 and 6 Newtons.

In many instances the flexible sheet will include a non-woven web forming the fibrous field. Preferably the non-woven web is partially embedded in a coating. The coating, in many cases, itself will form an ink-receptive outer surface of the print media. The print media may have ink printed on its outer surface. By 'ink' we mean to include all localized colorants that alter a perceived color of the surface, including dyes and pigments.

The non-woven web preferably has an overall basis weight of less than about 120 grams per square meter, and may comprise less than ⅓ of the total weight of the print media.

The male touch fastening elements are preferably arranged with a density of between 200 and 400 elements per square centimeter across the field. In some cases the male touch fastening elements each extends to an overall height of between 0.3 and 0.7 millimeters from a surface interconnecting the touch fastening elements. The surface may be of a resin forming, in combination with the surrounding fastening elements also formed of resin, a contiguous and seamless resin mass.

In some applications the print media has an overall basis weight of less than about 600 grams per square meter, or even less than about 500 grams per square meter, and can be installed readily in large sheets by a single installer.

The print side of the print media may have a surface roughness of less than 4.0 µm for some applications, and even less than 2.0 µm where a very smooth print surface is desired.

Another aspect of the invention features print media in the form of a flexible sheet and including both a textile fabric extending across a major dimension of the flexible sheet, and a continuous layer forming a coating on one side of the textile fabric, leaving fibers of an opposite side of the textile fabric exposed for releasable touch fastening engagement. The continuous layer underlies a printable surface of the print media on a side of the flexible sheet opposite the textile fabric. The flexible sheet is constructed so as to provide a peel strength when tested in accordance with ASTM D 5170-98 using HTH-830 (available from Velcro USA Inc.) as a hook surface, while the flexible sheet has a Bending Rigidity so related to the peel strength that the print media display system has a Wrinkle Propagation Coefficient of between 10 and 30.

In various configurations, the print media has characteristics as described above with respect to the entire display system.

According to another aspect of the invention, a printed media display system includes a media mounting surface carrying discrete male touch fastening elements arranged in a field extending across the surface (such as with each male touch fastening element having a stem projecting outward and supporting a fiber-engageable head), and print media in the form of a flexible sheet having a fastening side and a print side, the fastening side featuring engageable fibers in a fibrous field extending across a length and width of the flexible sheet, such that the fastening side of the print media is releasably engageable with the media mounting surface so as to display the print side. The media mounting surface and the fastening side of the print media together form a releasable fastening having a Shear Strength, as determined by ASTM D 5169-98 with the samples slit down to 25.4 millimeters in width. The flexible sheet also has a Torsional Rigidity (as measured by Kawabata tests as described below). Notably, the Shear Strength and Torsional Rigidity related such that the print media display system has a Torsional Alignment Coefficient of at least 5000, preferably between 5000 and 15000.

We have defined Torsional Alignment Coefficient (TAC) to be the direct ratio of Torsional Rigidity to Shear Strength (both having identical units, such as MPa). Configured for some applications, the print media display system has a TAC between 5000 and 15000, or even between 6000 and 12000.

In some cases, the print media also exhibits a SDSH of less than negative 40 grams force per centimeter.

The Bending Rigidity, in some embodiments, is preferably between 3.5 and 6 Newtons.

In many instances the flexible sheet will include a non-woven web forming the fibrous field. Preferably the non-woven web is partially embedded in a coating. The coating, in many cases, itself will form an ink-receptive outer surface of the print media. The print media may have ink printed on its outer surface. By 'ink' we mean to include all localized colorants that alter a perceived color of the surface, including dyes and pigments.

The non-woven web preferably has an overall basis weight of less than about 120 grams per square meter, and may comprise less than ⅓ of the total weight of the print media.

The male touch fastening elements are preferably arranged with a density of between 200 and 400 elements per square centimeter across the field. In some cases the male touch fastening elements each extends to an overall height of between 0.3 and 0.7 millimeters from a surface interconnecting the touch fastening elements. The surface may be of a resin forming, in combination with the surrounding fastening elements also formed of resin, a contiguous and seamless resin mass.

In some applications the print media has an overall basis weight of less than about 600 grams per square meter, or even less than about 500 grams per square meter, and can be installed readily in large sheets by a single installer.

The print side of the print media may have a surface roughness of less than 4.0 μm for some applications, and even less than 2.0 μm where a very smooth print surface is desired.

As will be described in more detail below, we have derived a new property, which we call the Wrinkle Propagation Coefficient (SPC), which we believe is highly relevant to the ability of a hook-loop display system to be dewrinkled by a smoothing motion during installation. Furthermore, we have defined this property as a relationship between readily measurable and engineered parameters, and have provided examples of display systems exhibiting this new property. This aspect of our invention is expected to greatly improve the ease and speed of installation of wide-area media secured by hook and loop fastening.

We have also derived another new property, which we call the Torsional Alignment Coefficient (TAC), which we believe is highly relevant to the ability to align adjacent panels of a multi-panel hook-loop display system. We have also defined this property as a relationship between readily measurable and engineered parameters, and have provided examples of display systems exhibiting this new property. This aspect of our invention is also expected to greatly improve the ease and speed of installation of graphic media secured by hook and loop fastening, particularly multi-panel media or media otherwise requiring very precise panel alignment.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A illustrates a successful propagation of a wrinkle in the printed media, while

Like reference symbols in the various drawings indicate like elements.

DETAILED DESCRIPTION

Figure 1:
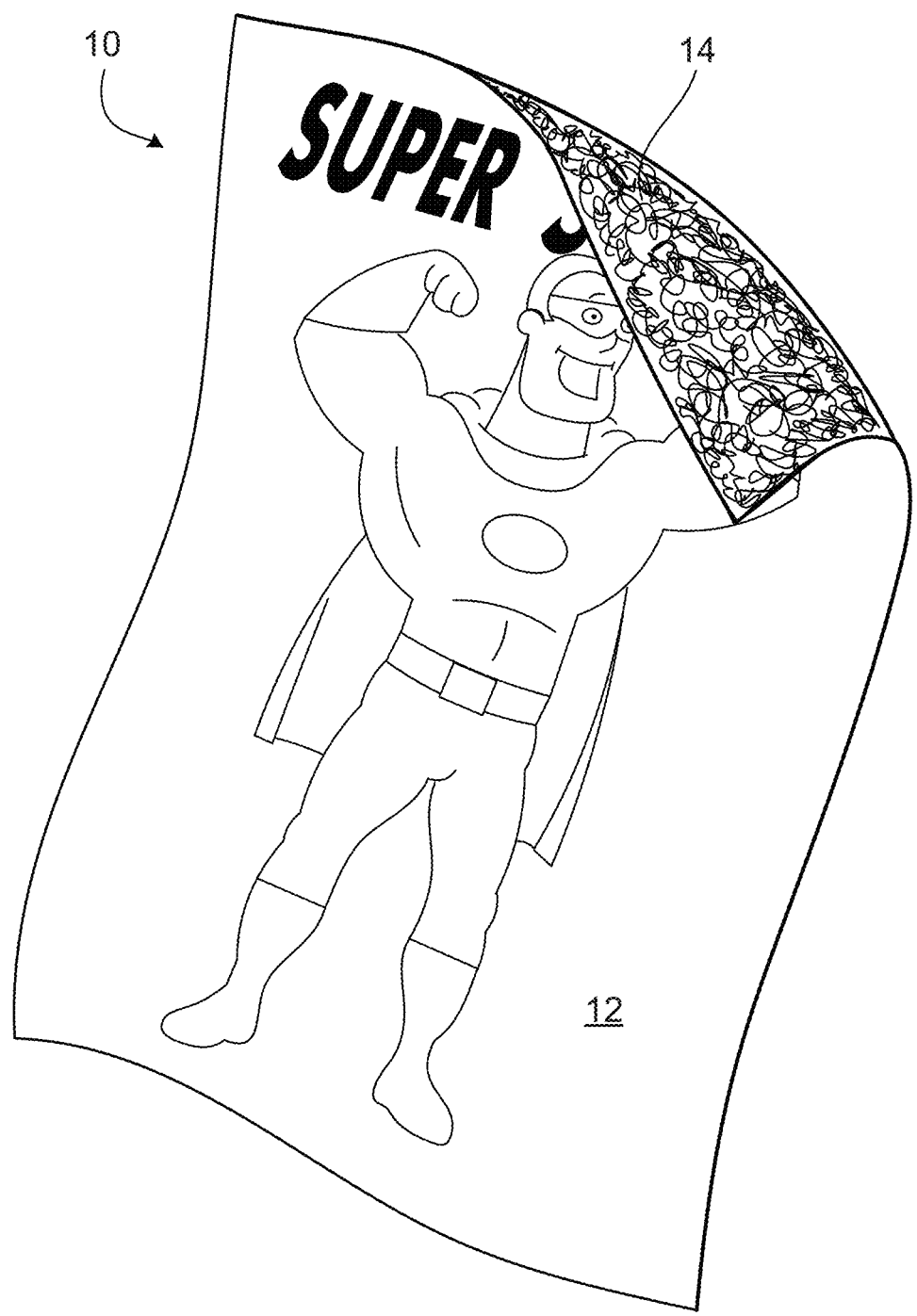
FIG. 1 shows a flexible sheet of printed media.

Referring first to FIG. 1, printed media 10 is a flexible sheet of material having a printed side 12 and a fastening side 14. The fastening side is essentially covered with a web of hook-engageable fibers, such as in the form of a non-woven material extending across the extent of the sheet. The printed side bears an image viewable when the sheet is releasably attached to a support surface. Media 10 consists essentially of a light non-woven loop material coated on one side with a starch-based stable coating that provides an ink-receptive surface on the printed side of the media. Media is sufficiently dimensionally stable in its plane, and sufficiently flexible in bending out of its plane that it can be processed through commercially available printers as a continuous substrate and then rolled for transport. Two specific examples are discussed below, but in general the printed media has a total basis weight of less than about 600 grams per square meter (gsm) and an overall thickness of less than about 1.5 millimeters. The width and length of the sheet will in some cases be one meter or more.

Figure 2A:
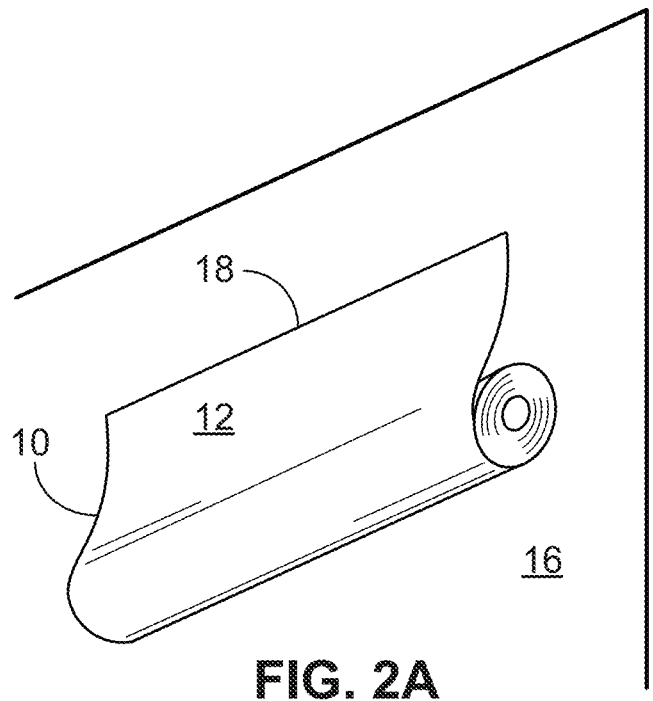
FIGS. 2A-2F sequentially illustrate securing a sheet printed media on a wall.
Figure 2B:
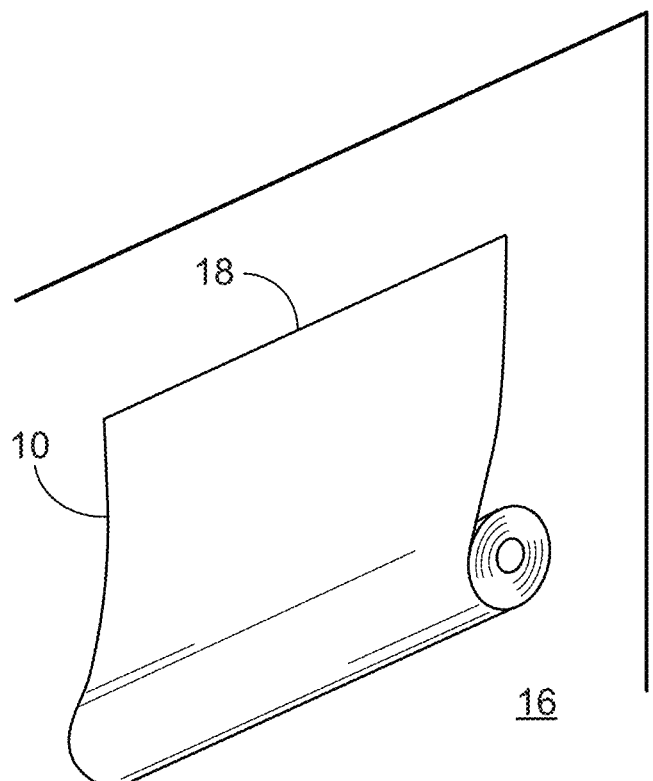
Figure 2C:
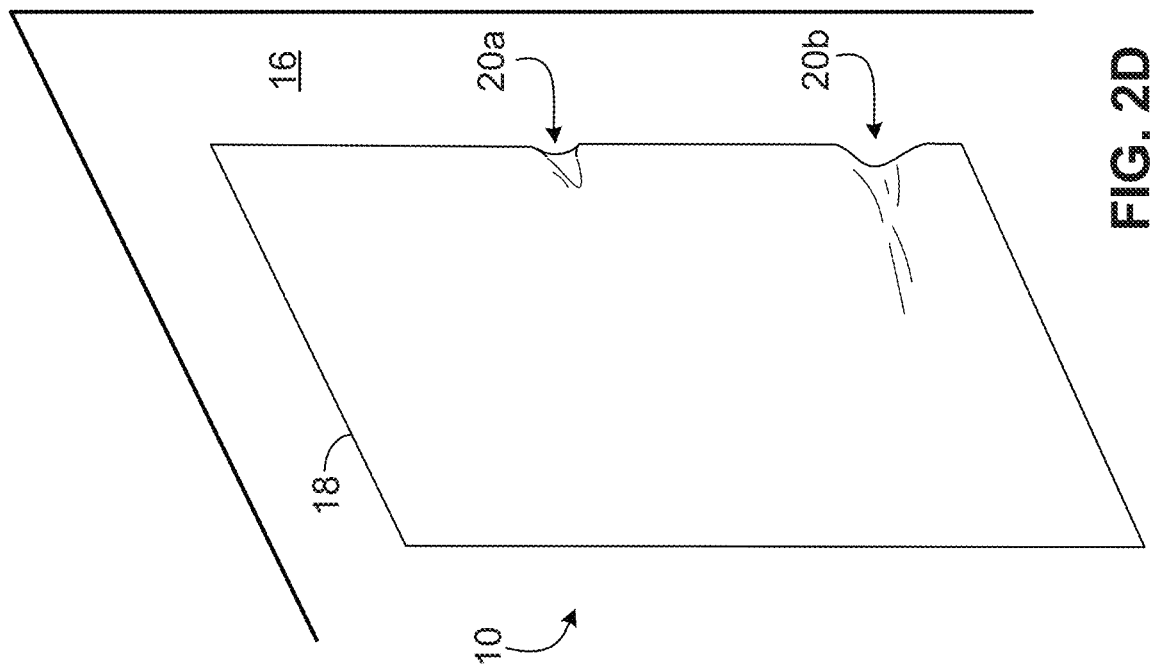
Figure 2D:
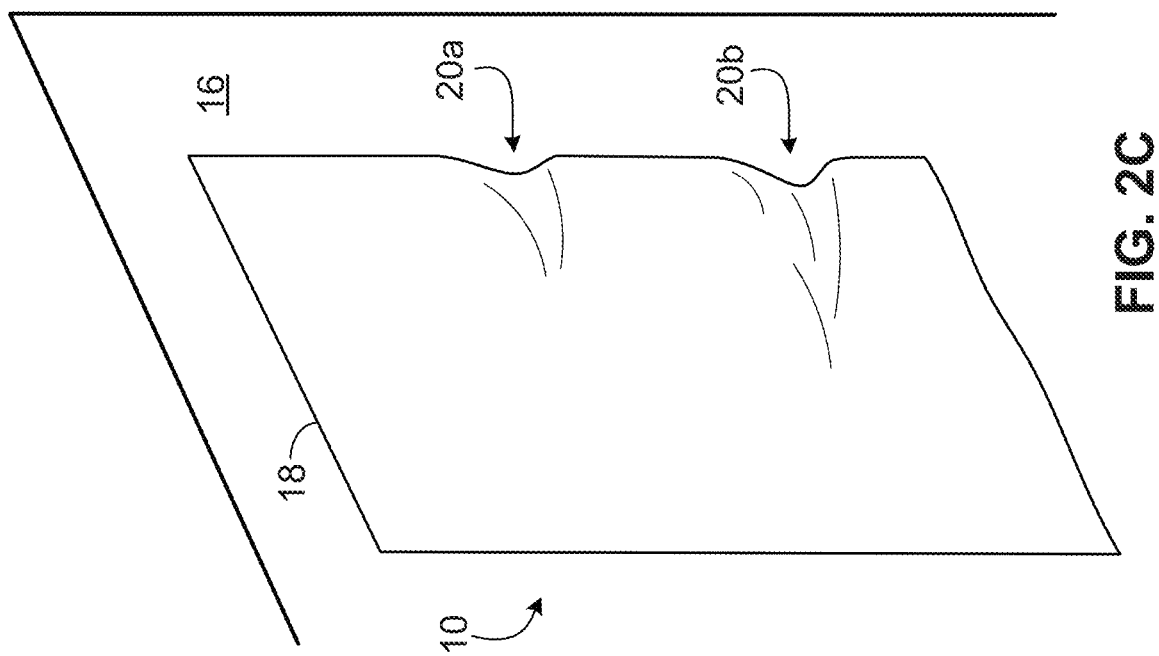
Figure 2E:
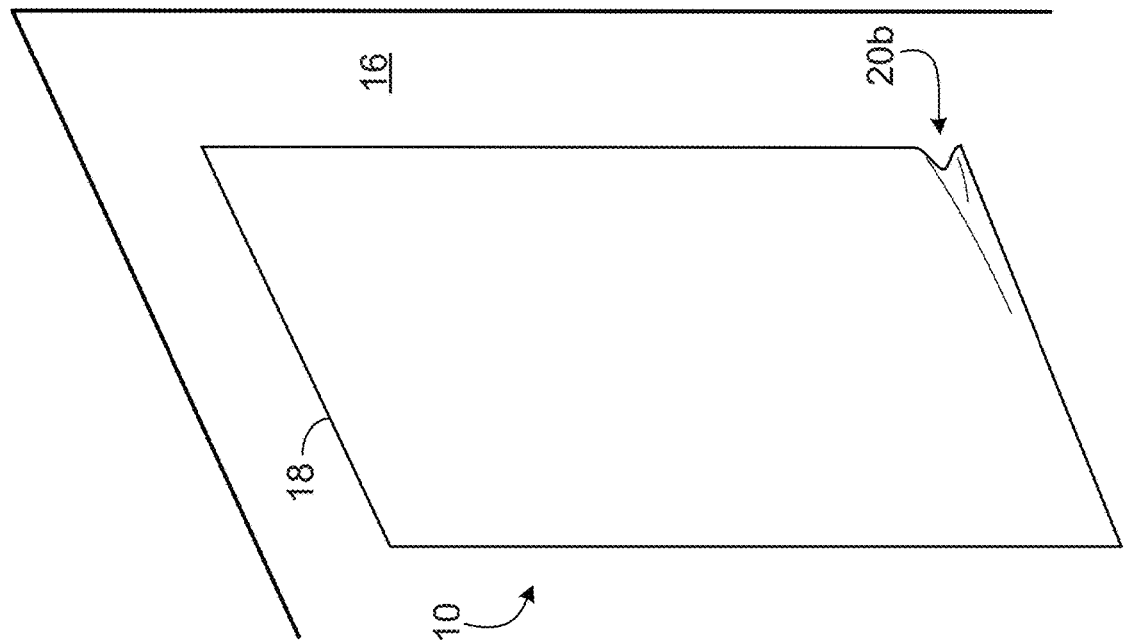
Figure 2F:
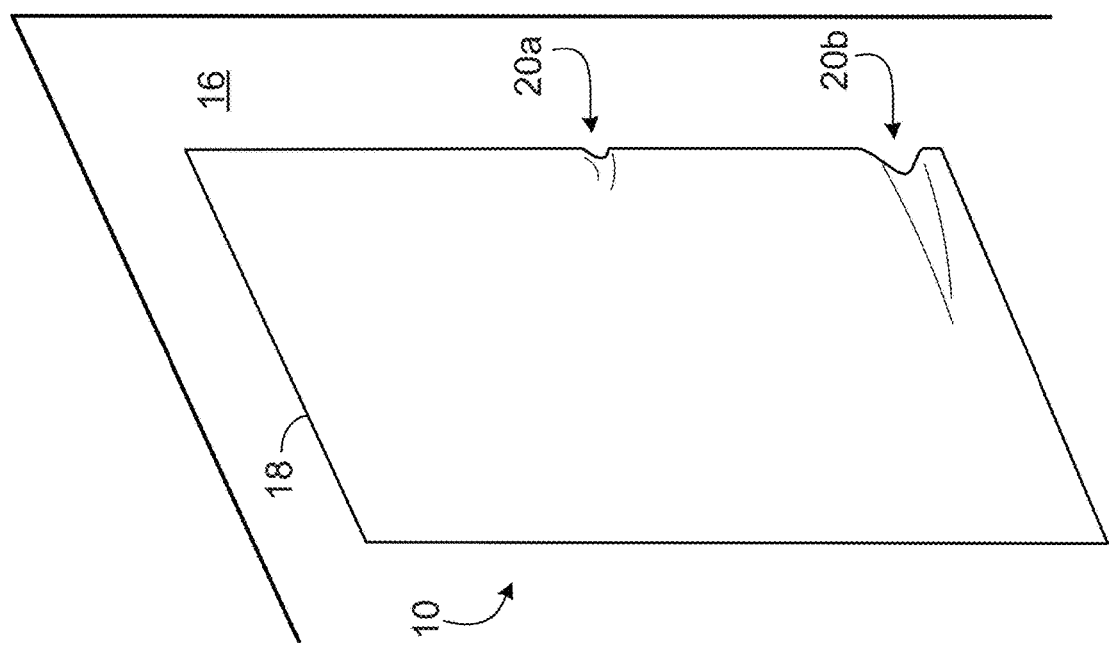

FIGS. 2A-2F sequentially illustrate securing printed media 10 across a surface 16, such as of a vertical wall. Media 10 is supplied as a roll with the printed side 12 facing outward. Surface 16 is covered, at least in the area on which media 10 is to be secured, with male touch fastener hooks (not visible in these figures as they are each extremely small) extending from the surface and exposed to engage fibers of the fastening side of the media. In this example, an upper edge 18 of the media is first secured to the wall by engagement of the fastening side fibers with the hooks of the wall (FIG. 2A). The width of the media is generally such that this can be done by a single person holding each upper corner of the media by hand. Once the upper edge is secured rough alignment with the desired orientation (e.g., with edge 18 horizontal), minor adjustments can be made to the alignment of the media with the upper edge engaged, due to the nature of the hook-loop engagement. With the media aligned in the desired orientation, the rest of the media is unrolled and progressively engaged with the wall surface and smoothed and lightly pressed by hand to ensure engagement (FIG. 2B). The illustrated topography of the completely unrolled media is exaggerated in FIG. 2C to show wrinkles 20a and 20b in the initially engaged media. In most cases any wrinkles would not be expected to be as large as are shown. The wrinkles are shown in FIGS. 2C-2F to illustrate how such wrinkles are readily removable with the media engaged. Given the position and relatively small size of wrinkle 20a, removal involves a smoothing motion applied by hand to the printed surface, moving toward the edge of the media at which the wrinkle terminates. As shown in the sequence of FIGS. 2C-2E, the position of the wrinkle does not appreciably change as its size diminishes. This is due to the nature of the hook-loop engagement, including the available backlash within such engagement, as well as the properties of the media sheet itself. In essence, a small amount of excess sheet area in the region of the wrinkle can be accommodated within the available shear motion and compressibility of the material in and around the wrinkle. Wrinkle 20b, on the other hand, represents a wrinkle that is too large to be removed by accommodation within the sheet and adjacent engagement. Rather, as shown in the sequence of FIGS. 2C-2F, the wrinkle is first somewhat compressed in size (FIG. 2D) and then translated down the media (FIGS. 2E-2F) by a simple smoothing motion applied by hand to the printed media surface. At the end of the progression (not shown), wrinkle 20b is effectively removed at the lower edge of the media, leaving an acceptably smooth, wrinkle-free media installation.

Figure 3:
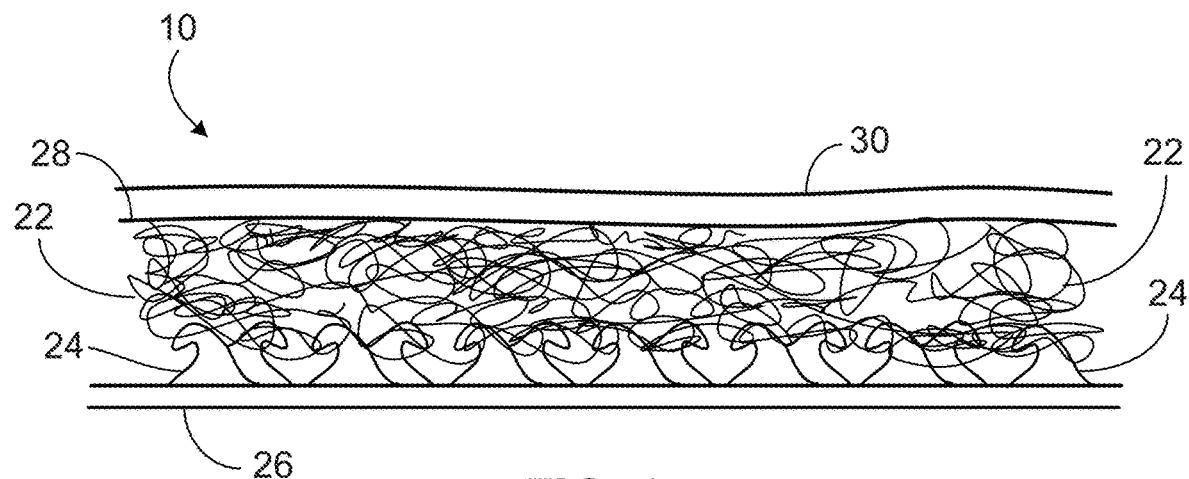
FIG. 3 schematically illustrates, in enlarged side view, a hook-loop interface between the printed media and the wall surface.

Before discussing in more detail the mechanics of wrinkle propagation, it would be good to discuss the nature of the hook-loop engagement between media and wall. As shown in FIG. 3, the fibers 22 of the non-woven web forming the fastening surface of media 10 become releasably engaged with the hooks 24 extending from the wall surface. The illustration of the web of fibers is schematic and not representative of any particular fiber diameter, distribution or density. But as shown, individual fibers are snagged in the crooks of hooks 24, and thus resist separation of media 10 from the wall surface. The web may be a non-woven loop material sold by VELCRO USA Inc. of Manchester, N.H., under the designation FNL-255 or FNL-264. FNL-255 has a basis weight of around 90 gsm, while FNL-264 has as a basis weight of only around 54 gsm, placing them in the category of extremely light non-woven materials. Other acceptable loop materials can be fashioned described in U.S. Pat. No. 6,329,016 or U.S. patent application Ser. No. 14/725,420, the entire contents of both of which are incorporated fully by reference.

The illustrated hooks 24 are of the J-hook type known in the art, but could alternatively be of any other appropriate shape designed to releasably snag fibers, as long as the necessary engagement properties are achieved. For example, 'palm tree' type or 'mushroom' type male fastener elements, or other shape with an overhanging feature for snagging fibers, could be employed. Hooks 24 individually extend from a common base 26 of resin, such that the hooks and base together form a contiguous mass of resin. Methods of molding such hooks with a common base are known in the art and described, for example, in U.S. Pat. No. 4,775,310 to Fischer. The hooks and base can be formed of thermoplastic material, such as polyethylene or polypropylene. A suitable size of hook is the CFM-29 hook, available in different materials and distributions from VELCRO USA Inc. The hooks 24 may be, for example, of less than about 0.5 mm in height and may extend from a base of less than about 0.2 mm in thickness. The hooks and base may be molded of a transparent resin, such that the surface of the wall is visible through the touch fastener sheet with the media removed. The male touch fastener may be adhered to the wall surface by an adhesive, such as a pressure sensitive adhesive or a paste adhesive, such as those commonly employed to adhere wallpapers and the like. Generally, the male touch fastener sheet is intended to remain permanently attached to the wall through several changes of print media. To that end, the hooks themselves should be designed such that removal of the print media does not cause permanent damage to the hooks. The male touch fastener sheet may itself be directly adhered to the wall, or may be bonded to a thin, semi-rigid or rigid board that is itself fastened to the wall surface, such as by discrete panel fasteners. In the latter case, such boards may be pre-assembled to be covered on one side by a touch fastener membrane, and can be formed of a foam, such as by the method described in U.S. patent application Ser. No. 13/613,601, published as US2013/0008113A1, the contents of which are incorporated herein by reference. Such boards may also provide some heat and sound insulation, in addition to providing an engageable surface.

Still referring to FIG. 3, the opposite side of the non-woven web is embedded into a coating 28 that forms the outer surface on which images may be formed by inks or dyes. Coating 28 itself adds about 250 gsm in weight, such that the print-ready media has a total basis weight of less than 350 gsm. The coating is a version of a type of material developed by CENTICORE COATING B.V., Maassluis, NL, and sold under the name BLUE LATEX. This material is marketed as a sustainable alternative to SBR latex and is made from modified potato starch and poly(lactic acid) (PLA). For application to very porous non-woven webs, the viscosity of the coating material may have to be modified, and/or fluorocarbon added for enhanced surface tension, in order to prevent flooding of the engageable fibers on the non-coated side of the non-woven. Other helpful modifications of the coating material for use with the FNL non-wovens include maintaining a low particle size, addition of a stabilizer to prevent discoloration from heat or UV exposure during printing, the addition of a suitable printing surface pigment such as titanium oxide. Specific processing parameters will be varied to yield the desired finish and cure, given the intended application. For some applications it can be helpful to modify the coating composition to help slow the formation of a film on the surface of the coating during the initial cure, and/or to apply a vacuum to the mixed composition to remove bubbles prior to application.

The coating material may be applied directly to the surface of the non-woven with a doctor blade. The temperature of the coating at the time of application should be low enough to avoid significant shrinking or melting of the non-woven, although some controlled shrinkage can be advantageous, as discussed below. The coating material flows around individual fibers of the non-woven, such that portions of fibers become embedded in the coating. The loop-side of the coating may be cured first, such as by forcing air toward the loop side of the material as the coated material passes through a curing oven. Infrared radiation may be then applied from the printable side, to complete drying and cure. In general, the process should dry and cure the coating in a reasonably short time in order to quickly stabilize the product. Drying time can be decreased, of course, by reducing the percentage of water content in the coating, or conversely increasing the percentage of solid content. For coating a polypropylene/polyamide blend like FNL, the coating is applied at a temperature of 110 to 115 degrees C., with a coating blade having an opening width of 0.40 mm, to apply a wet layer of coating of about 370 gsm that, when dry, results in a coating with a thickness of about 0.2 mm and a basis weight of about 220 gsm. The coated material is passed through an oven of length 5.2 meters, at a speed of 2.5 meters per minute and an oven temperature of 120 degrees C., then through an infrared drying station with a length of 2 meters set at 120 degrees C.

The coating material discussed above has the added advantage of being generally recyclable. Combined with a recyclable or biodegradable non-woven and water-based inks, media produced according to the methods described herein can be more readily recycled and are preferred for applications requiring use of only 'green' materials. The media itself can thus be made free of phthalates, PVC and plasticizers, and suitable for all typical printing inks. Additives can be included to provide anti-bacterial properties such as for hospital waiting and examination rooms, magnetic attraction properties, scents, insect repellent, etc.

Some consistent, controlled shrinkage of the coated loop material during the curing and drying of the coating can produce a pleasantly textured surface that is readily printable by ink jet printing equipment and suitable for many applications. In some cases the non-woven web shrinks up to 30% in area during drying and cure. A textured, printed surface is visible, for example, in FIG. 6C.

One beneficial characteristic that we have found in the printed media described above is that the printed surfaces don't tend to permanently 'mark' when creased, and that they slowly relax to recover from a bending set. This characteristic is believed to be primarily a function of the coating.

The upper surface of the printed media 10 shown in FIG. 3 carries an image formed by a dye or ink 30 or some other colorant applied to the surface of coating 28. The ink can be applied by known print methods, such as screen, sublimation transfer or ink jet printing. The dimensional stability and flexibility of media 10 enable continuous, full width ink jet printing on a moving conveyor, such as on a LARIO printer available from MS Printing in Milan, Italy, for example. The media may be prepared and printed in very wide format and then slit into one-meter-wide widths and either cut to discrete lengths or spooled for storage and shipment.

Figure 4A:
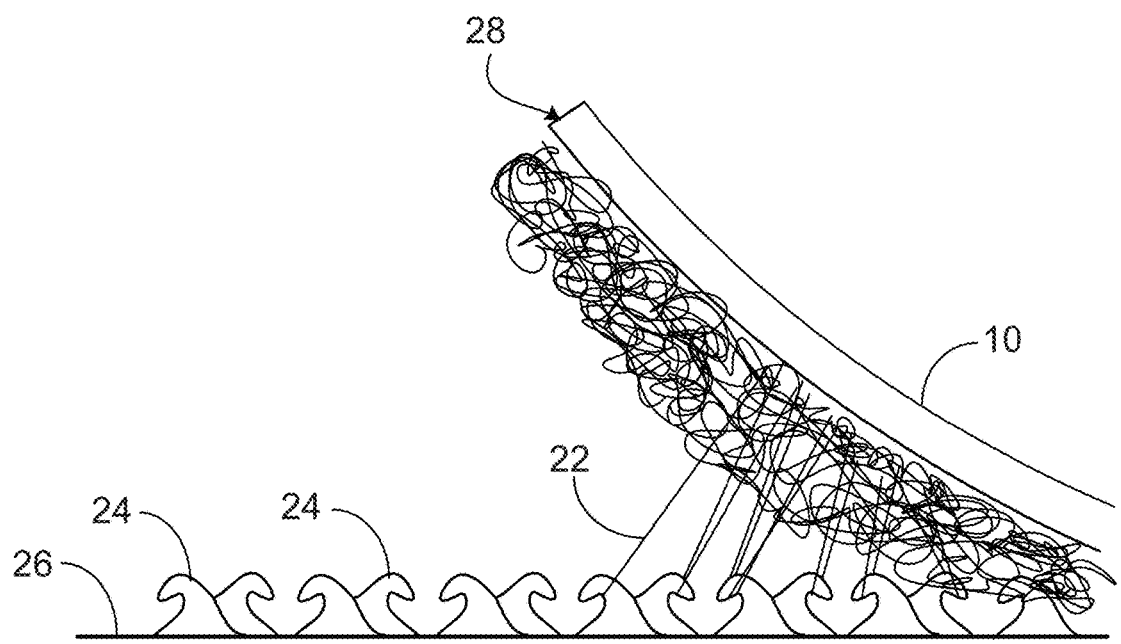
FIGS. 4A and 4B show the progressive disengagement of the hook-loop interface along the leading line of a separation.
Figure 4B:
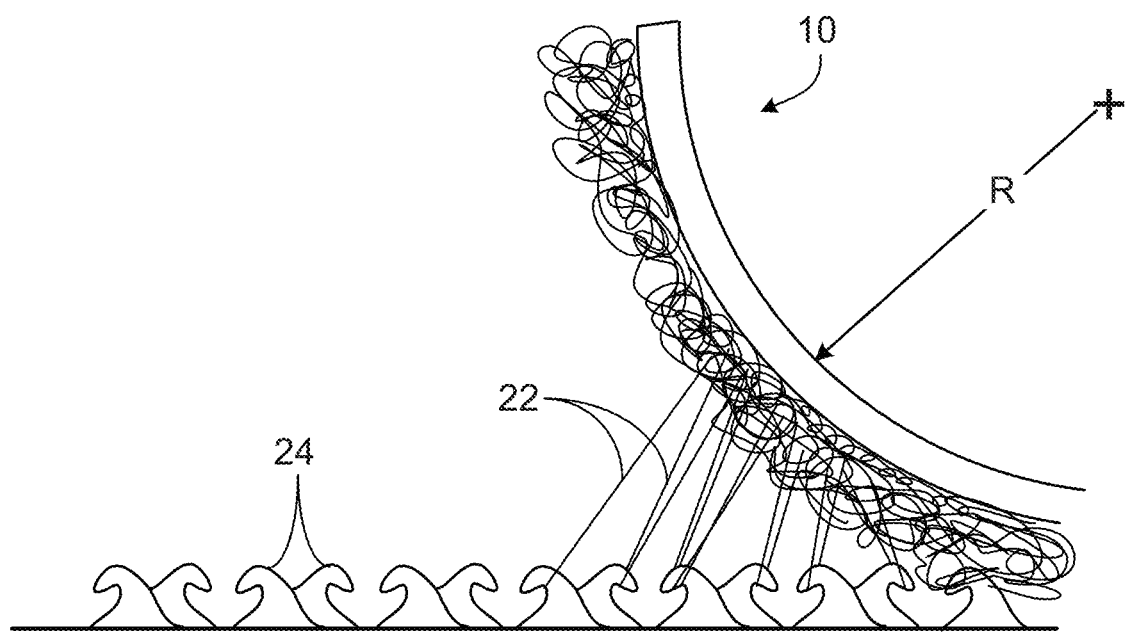

Referring to FIGS. 4A and 4B, the progressive disengagement of a hook-loop interface along the leading line of a separation (as will occur, for example, at the leading edge of a traveling wrinkle) is a stochastic phenomenon involving the combined effect of a large number of discrete single-fiber engagements and releases. As the printed media is locally bent away from the hook surface (FIG. 4A), individual fibers retained in the crooks of individual hooks are pulled taut and resist further separation until the fiber either is pulled from the media, breaks, or is released from the crook. Because the hook surface is intended to be engaged multiple times over its life, the engagement should be designed such that any release from the crooks does not involve a significant permanent deformation or breakage of the hooks. The fiber load at which a hook will release a fiber extending at a particular angle can be affected by the material properties of the hook resin as well as the shape of the hook. As it is also preferable that at least most fiber releases do not pull fibers from the media or break the fibers, it is preferable that the hooks be designed to elastically deform at the desired load to release the fibers.

The low thickness of the engageable portion of the non-woven web helps to maintain a consistent peel resistance as the wrinkle wave propagates. The amount of fiber extension shown in these figures is for illustration only. As each set of engaged fibers is released, the next set along the progression bears more of the peel load, etc. The random nature of the fiber distribution also helps to smooth the peel force.

At a higher peel force (FIG. 4B) the media is bent even more at the leading edge of the wave, resulting in a steeper rise of the wrinkle at its leading edge and a smaller leading bend radius 'R'. The steepness of the rise can also, in some cases, be affected by fiber extensibility.

Figure 5A:
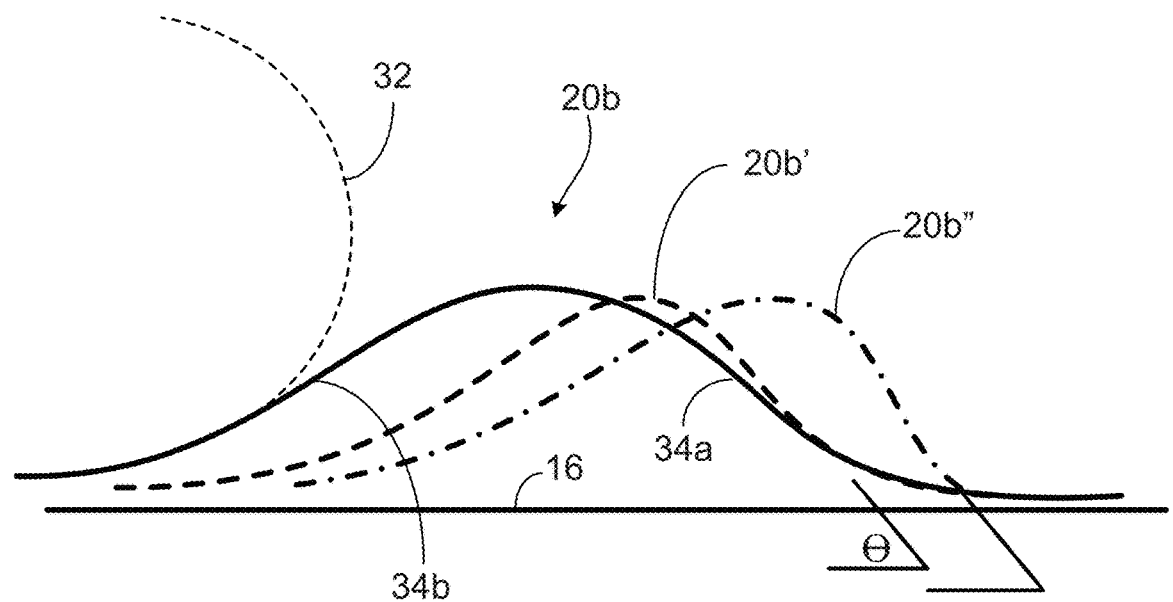

Referring next to FIG. 5A, in a successful wrinkle propagation (to the right as viewed in the figure) wrinkle 20b, as urged by an installer's hand 32 in a smoothing motion to the right across the printed media surface, for example, deflects and then translates. The initial profile of the wrinkle is schematically illustrated in solid line with relatively symmetric leading and trailing halves. The upper portion of the wrinkle is convex, as viewed from above, and extends between forward and rearward inflection points 34a and 34b. As the installer presses against the trailing half of the wrinkle, the wrinkle shape changes as the trailing half advances and the base of the leading half remains secured. The portion of the upper surface of the media coating behind the rearward inflection point 34b, and ahead of the forward inflection point 34a, is put into greater compression as the curvature of the media in those regions increases, while the tension in the upper surface of the upper portion of the wrinkle is also increased. Note that any increased compression in the trailing half of the wrinkle may be more than offset by tension induced by friction with the installer's hand. Eventually the wrinkle reaches a state, shown as dashed line 20b', in which the maximum peel resistance of the engagement at the base of the leading half is reached. At this state the leading half has developed a somewhat steeper slope than in the initial (unloaded) wrinkle shape, with a slope of the wrinkle at the forward inflection point 34a making an angle of θ with the plane of the wall. At this point the wrinkle begins to propagate, moving to the right with the forward half of the wrinkle maintaining a substantially constant shape and slope. The shape of the traveling wrinkle is such that the coating of the media does not reach a local curvature significant enough to cause creasing or other plastic deformation. During propagation, the resistance to bending of the media, supplied primarily by the coating, generates a peeling force at the forward edge of the wrinkle sufficient to progressively disengage the hook-loop interface.

Figure 5B:
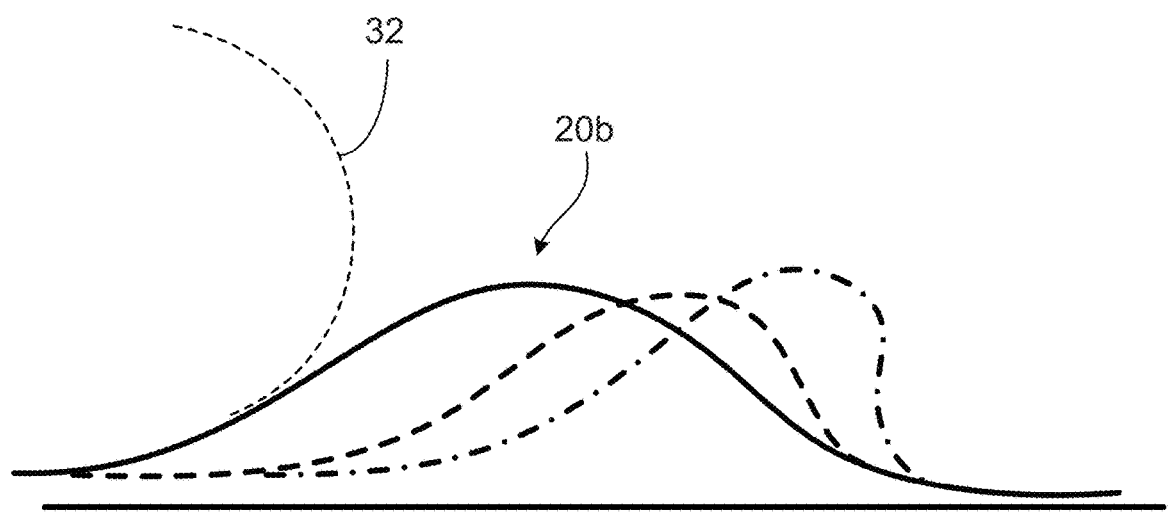
FIG. 5B illustrates an unsuccessful attempt at wrinkle propagation.

A wrinkle propagation failure, by contrast, is illustrated in FIG. 5B. In this case, the wrinkle initially deflects as in FIG. 5A. But because the peel resistance at the forward edge of the wrinkle is too high, given the other characteristics of the media and interface, peel is not initiated before the media undergoes a significant bending at the lower edge of the forward half of the wrinkle, the slope at the forward inflection point goes significantly beyond 45 degrees, and a folding or creasing follows. While we discuss these effects in terms of an elongated wrinkle, it will be understood that these principles also apply to the propagation and removal of 'bubbles' in which the media is engaged all around the bubble but extends away from the wall surface within the bubble.

Figure 6A:
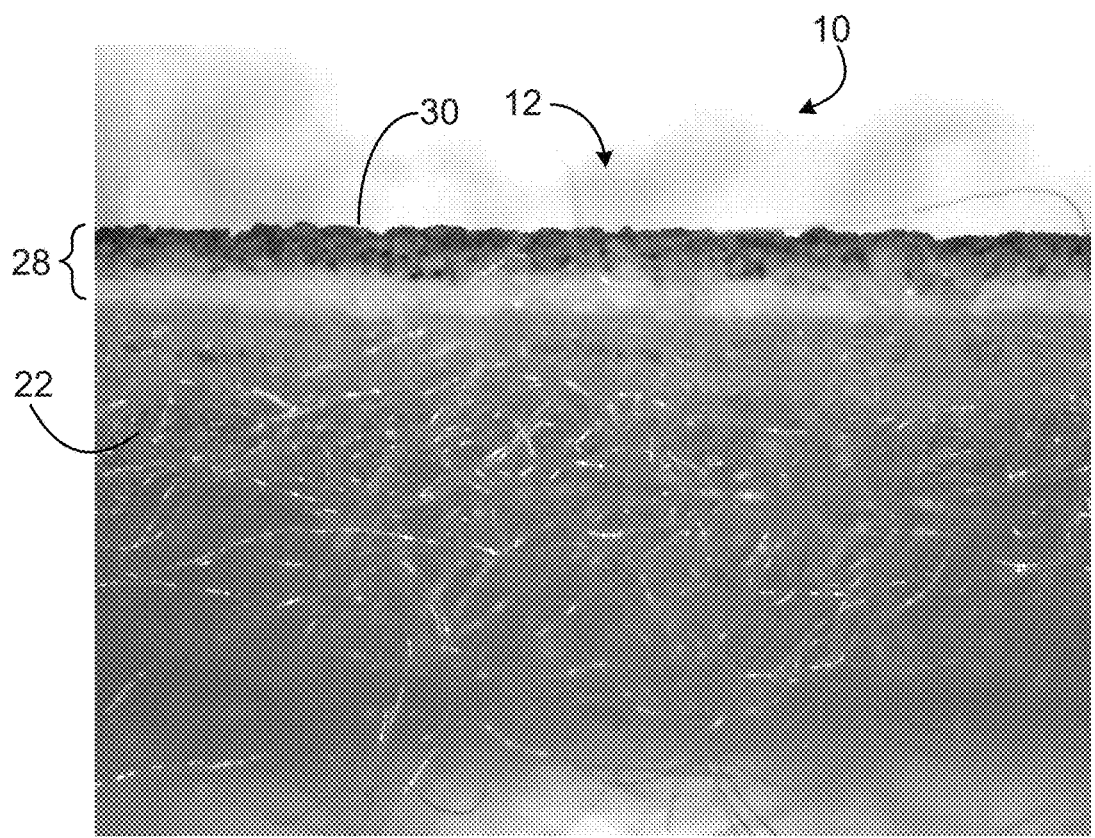
FIGS. 6A-6C are microphotographs of edges of three different examples of printed media.

Referring next to FIG. 6A, a first example of printed media 10 is a coated FNL-255 non-woven, the coating 28 applied as discussed above. The non-woven has a basis weight of 90 gsm, and the coating 28 adds another 383 gsm, for a total media basis weight (without ink) of 473 gsm. The thickness of this example is 1.21 mm, as measured in accordance with ASTM D1777. This material underwent standard Kawabata testing in which it was determined that the outer coating surface has a roughness of 3.82 μm and a shear hysteresis of −78.9 grams per centimeter at 0.5 degrees, and of −78.9 grams per meter at 5 degrees. When engaged for the first time with hook product HTH-830 from Velcro USA Inc. in Manchester, N.H., it exhibited a peel value of 0.209 N, and as measured according to ASTM D5170-98, integrator average method, and a shear strength of 0.87 N per square cm, as measured according to ASTM D5169-09, tested as samples of one inch width. Hook product HTH-830 is of molded polypropylene, with 272 hooks per square centimeter arranged in rows facing in opposite directions, each hook having a CFM-29 hook shape as disclosed in FIG. 1 of U.S. Pat. No. 6,131,251 and extending to a height of 0.39 millimeter. When tested by the D45-1348 bending stiffness test, as described below, this example exhibited a bending stiffness of 4.65 N. The torsional shear stiffness of this example, calculated from measured tensile stiffness and Poisson's ratio in a standard tensile test as described below, was 83 N per square mm.

Figure 6B:
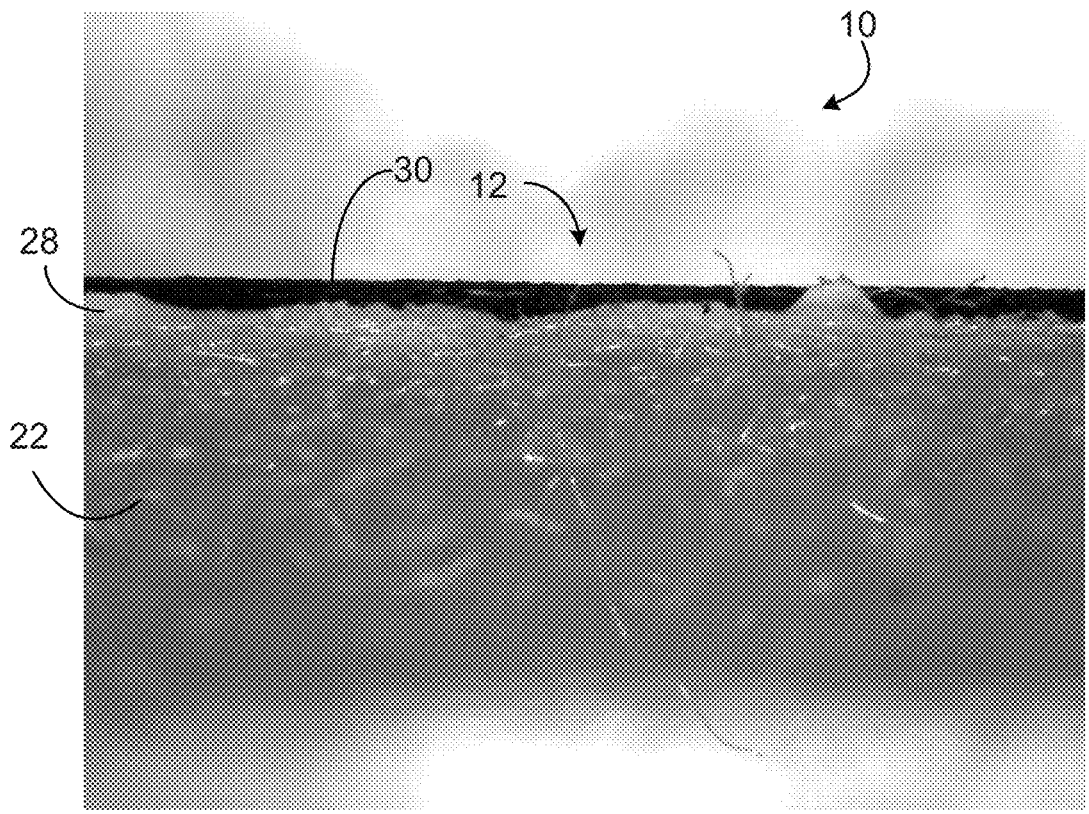

The example of printed media 10 shown in FIG. 6B is also a coated FNL-255 non-woven, but with a coating weight of 414 gsm, for a total media weight of 504 gsm. The thickness of this example is 0.63 mm, as measured in accordance with ASTM D1777. This sample was produced by extruding the coating material into a calendering nip with the non-woven. The calender roll that engages the extruded coating is maintained at a temperature of 20 degrees Celsius, while the rubber roll that presses against the back of the non-woven in the nip is kept at 80 degrees Celsius. The non-woven is preheated and dried just prior to calendering. The calendered, coated material is then cooled over a relatively long period in air, without forced-air cooling. This sample has a smoother printing surface than the sample shown in FIG. 6C, believed to be the result (at least in part) of the action of the calender roll against the coating. The printable media had a resulting roughness, in Kawabata testing, of 1.18 μm and a shear hysteresis of −70.1 grams per centimeter at 0.5 degrees, and of −70.1 grams per meter at 5 degrees. When engaged for the first time with hook product HTH-830 it exhibited a peel value of 0.26 N, as measured according to ASTM D5170-98, integrator average method considering only the data from 50 to 175 mm of displacement of the machine-head, and a shear strength of 3.32 N per square cm, as measured according to ASTM D5169-09, tested as samples of one inch width. When tested by the D45-1348 bending stiffness test, as described below, this example exhibited a bending stiffness of 4.51 N. The torsional shear stiffness of this example, calculated from measured tensile stiffness and Poisson's ratio in a standard tensile test as described below, was 260 N per square mm.

Figure 6C:
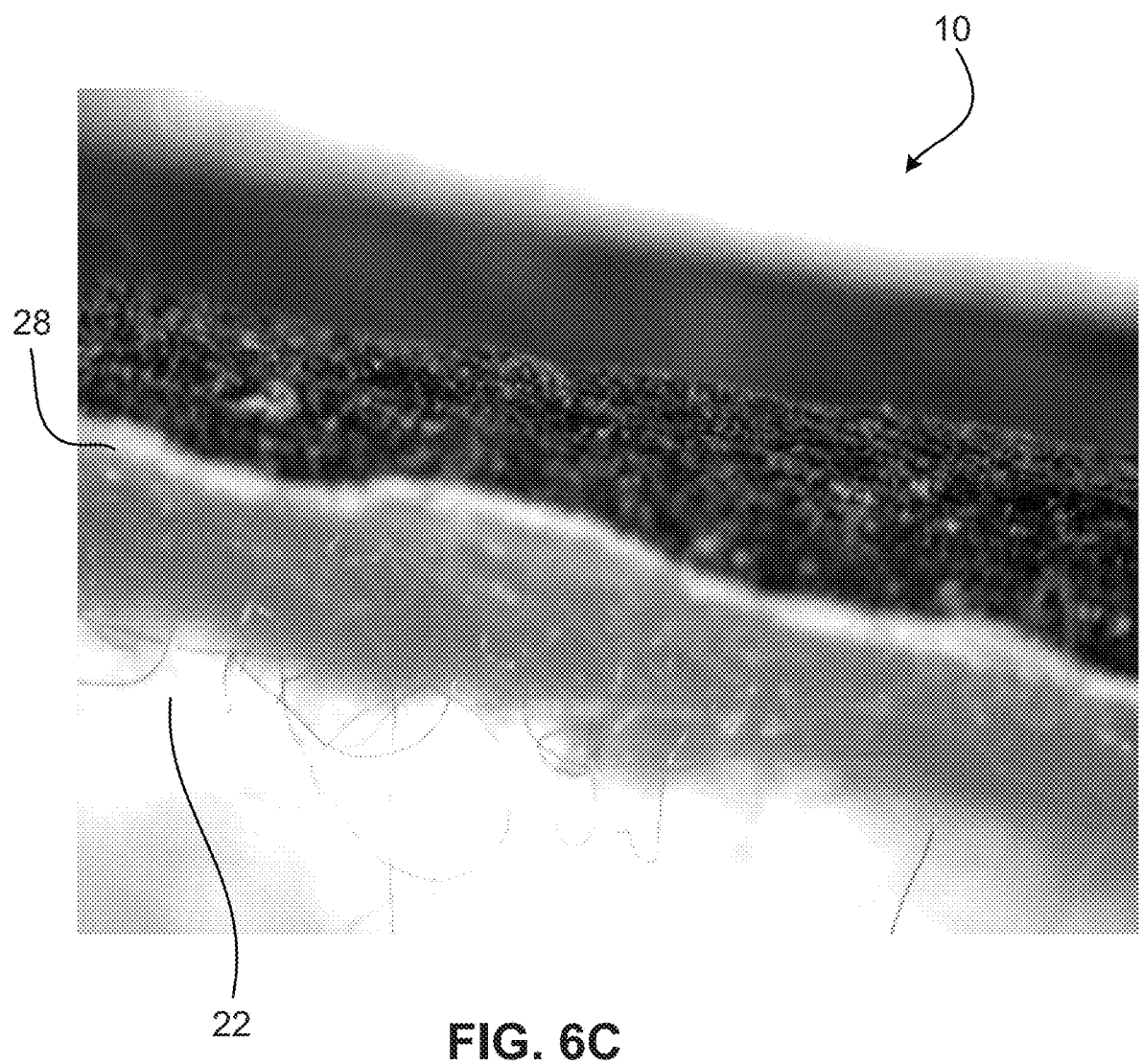

The third example of printed media 10, pictured in FIG. 6c, is also a coated FNL-255 non-woven, but with a coating weight of 258 gsm, for a total media weight of 348 gsm. The thickness of this example is 0.85 mm, as measured in accordance with ASTM D1777. This sample was subjected to forced air cooling immediately after coating, and it is believed that the texture is at least partially a result of rapid cooling and a difference in thermal expansion coefficients of the two fiber types (PP and PET) constituting the non-woven material. The sample had a resulting roughness, in Kawabata testing, of 6.85 μm and a shear hysteresis of +41.9 grams per centimeter at 0.5 degrees, and of −71.1 grams per meter at 5 degrees. When engaged for the first time with hook product HTH-830 it exhibited a peel value of 0.17 N, as measured according to ASTM D5170-98, integrator average method considering only the data from 50 to 175 mm of displacement of the machine-head, and a shear strength of 3.64 N per square cm, as measured according to ASTM D5169-09, tested as samples of one inch width. When tested by the D45-1348 bending stiffness test, as described below, this example exhibited a bending stiffness of 0.75 N. The torsional shear stiffness of this example, calculated from measured tensile stiffness and Poisson's ratio in a standard tensile test as described below, was 68 N per square mm.

We have determined that the ability to propagate wrinkles across a flexible sheet of material secured by hook-loop interface is significantly affected by the relationship between the bending stiffness of the flexible sheet and the peel strength of the fastening. We have come to express this ability in terms of what we call a Wrinkle Propagation Coefficient (WPC), which is the direct ratio of bending stiffness to peel strength, expressed as a dimensionless measure such as N/N. We have determined, based on our understanding of the principles underlying this phenomenon and our work with various materials, that a WPC of between 10 and 30 provides a desirable result. As a point of reference, the WPC of the examples of FIGS. 6A and 6B have a WPC of 22.25 and 17.65, respectively, when engaged with a wall surface covered with the hook material described above, and exhibited very smooth wrinkle propagation effects, making them very easy to install and smooth. The example of FIG. 6C, on the other hand, had a WPC of only 4.47 when so engaged, and was not readily smoothed of wrinkles.

Figure 7:
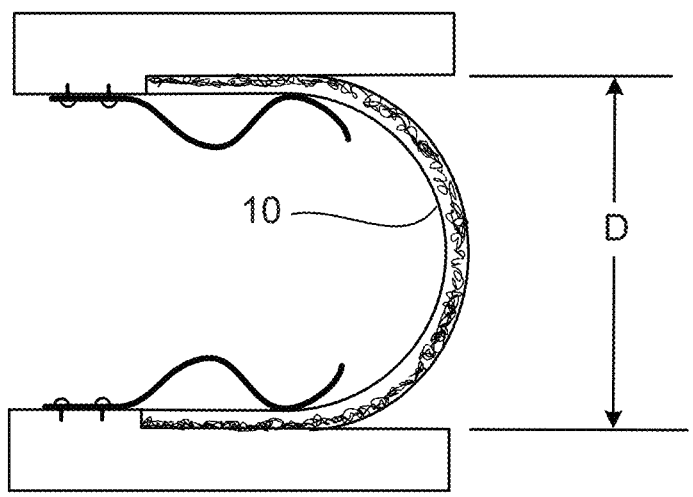
FIG. 7 illustrates a printed media bending stiffness test.

FIG. 7 illustrates a fixture employed in the D45 1348 "Textile Floor Coverings and Coating Flexibility" test developed by PSA Peugeot Citroen, as updated Apr. 12, 2003, and employed to test the bending stiffness of various samples as described herein. The test specification should be consulted for specific test parameters, but in general a 270 mm by 80 mm sample of printed media 10 is installed between two mating parallel jaws that are initially separated by a distance 'D' greater than 100 mm, with the print side facing inward. The plates are slowly brought together to a distance 'D' of less than 50 mm, while recording the force applied to the plates to further bend the sample. The difference in measured compressive force between the positions corresponding to D=100 mm and D=50 mm (in N) is recorded as the bending stiffness.

Figure 8:
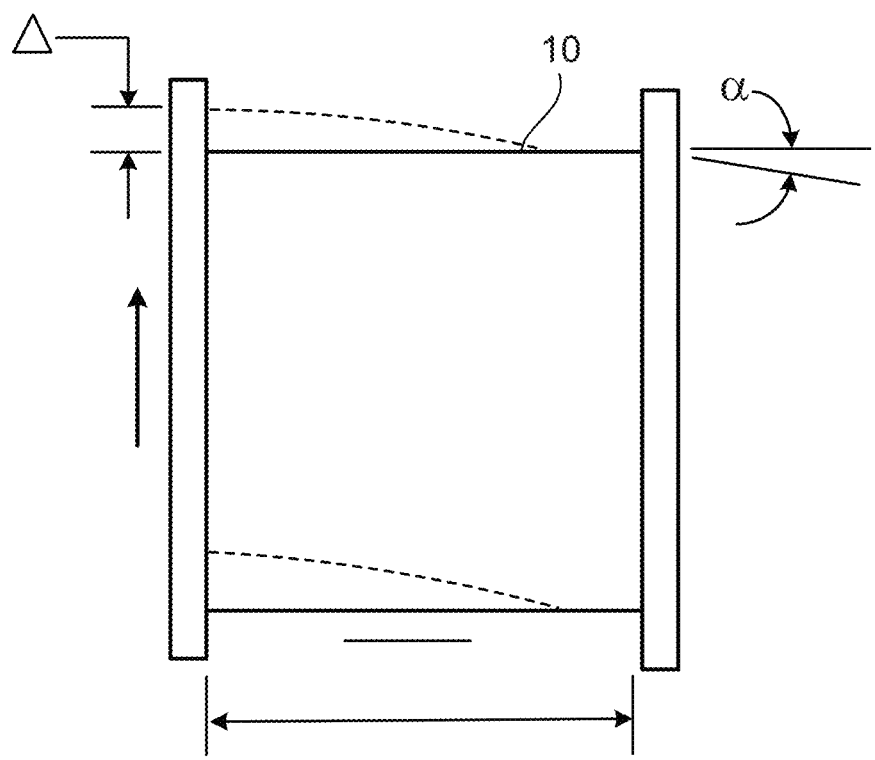
FIG. 8 illustrates a Kawabata shear stiffness test.
Figure 9:
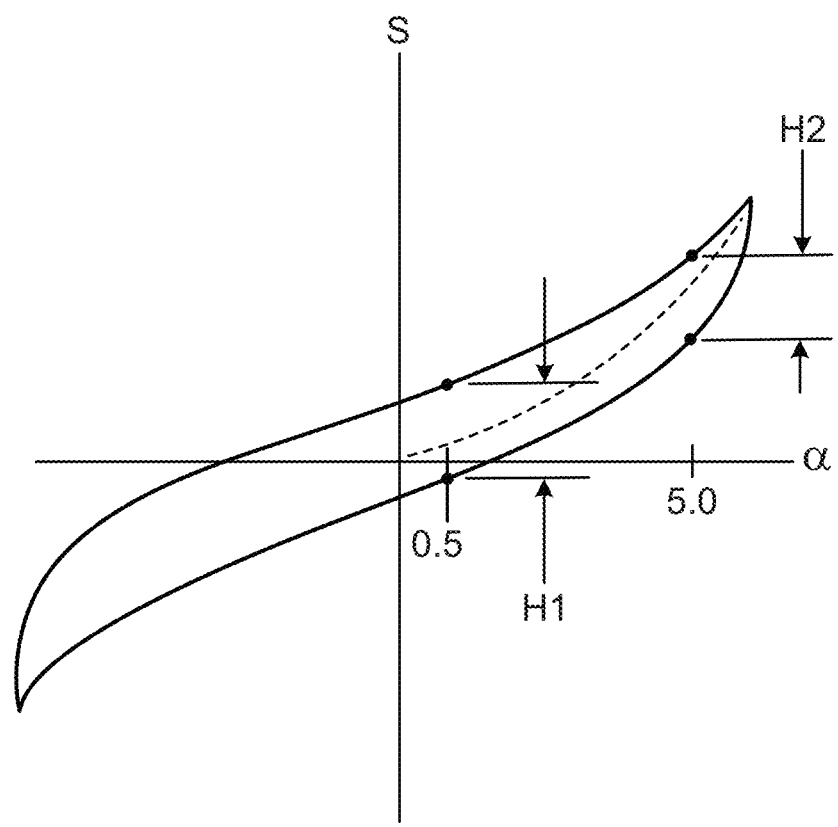
FIG. 9 shows how shear hysteresis is determined from the results of such a test.

FIG. 8 illustrates a fixture employed in the Kawabata test method to determine shear hysteresis. A sample of media 10 is held taut and under constant tension between two parallel bars gripping opposite edges of the media. One bar (the one on the right in the figure) is held stationary while the other is displaced along the direction of the bar, while the displacement 'A' of the bar and the force applied to the bar are measured. This motion is applied first in one direction, then in the other, through media twist angles 'α' of at least +/−5 degrees, as shown in the plot of shear stress 'S' to shear angle 'α' in FIG. 9. The small-displacement hysteresis 'H1' at a shear angle of 0.5 degrees, and the large-displacement hysteresis 'H2' at a shear angle of 5.0 degrees are determined from the measured data.

Figure 10A:
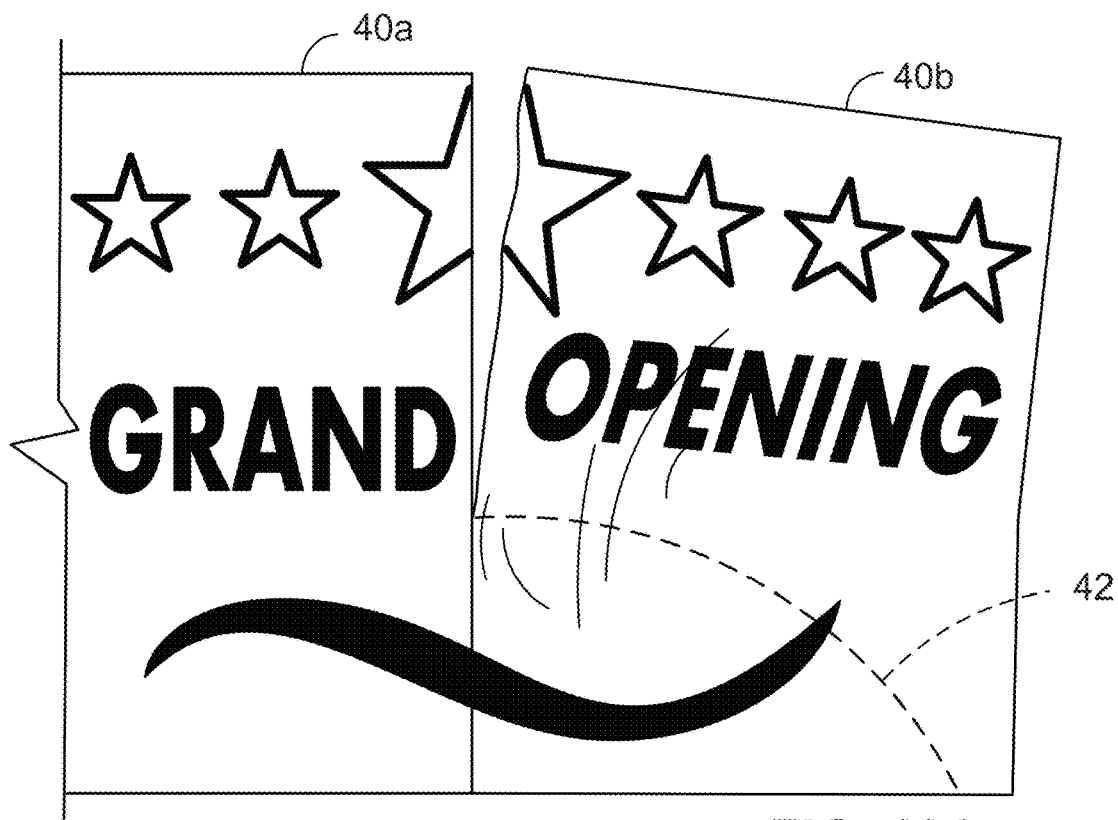
FIGS. 10A and 10B illustrate adjustment during installation of a multi-panel graphic display bearing a simple graphic, and FIGS. 11A and 11B similarly represent adjustment during installation of a multi-panel graphic display bearing a printed photographic image.
Figure 10B:
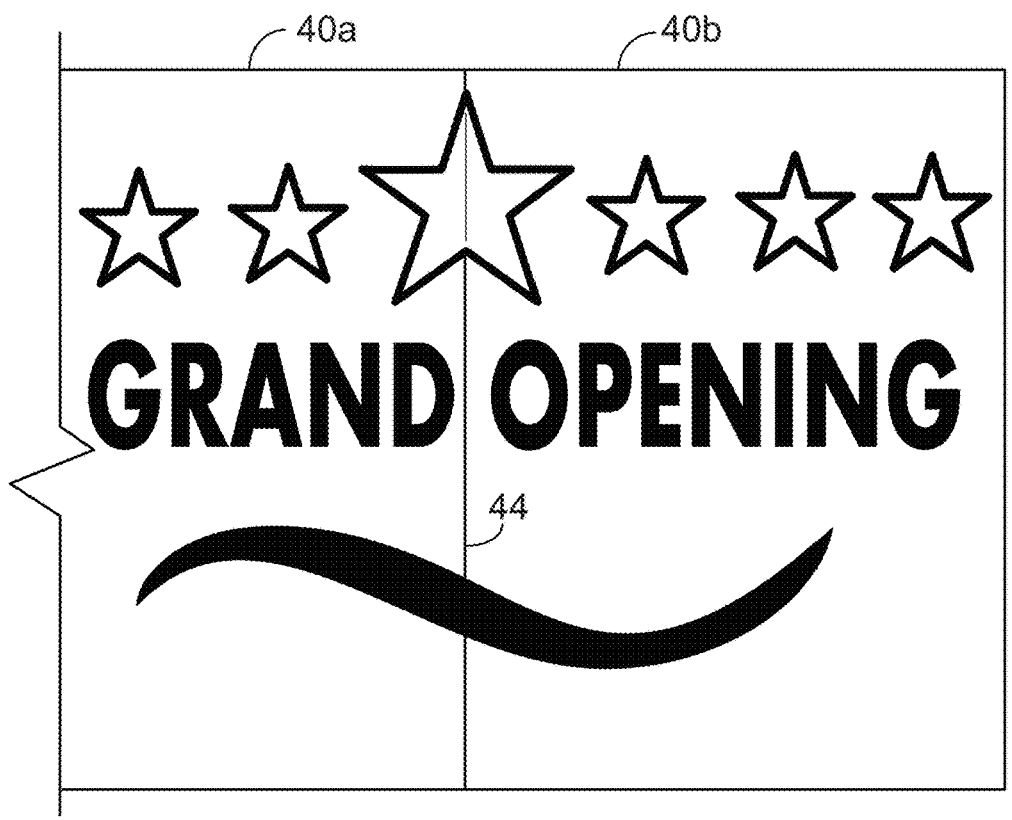
Figure 11A:

FIGS. 10A and 10B illustrate a method of installing a multi-panel graphic on a wall surface, where the wall surface is essentially covered with touch fastening hooks and the back surface of the panels are hook-engageable. After installing a first panel 40a, a second panel 40b prepared for installation in alignment with the first. Generally such installations are done manually, with one corner of the second panel placed in exact alignment with a corresponding corner of the first panel. In this illustration, installation of the second panel was initiated at the bottom left corner, but in many cases installation would begin with the upper left corner. The hook-loop fastening interface, which engages essentially upon light contact, spreads from the engaged corner across the second panel. It can be difficult to begin the second panel engagement in such an exact alignment with the first panel that their mating edges perfectly align along the entire length of the edges. Alignment is further complicated by the size of the panels, which can be one meter or more in width and at least one meter in length (height, as shown in this figure). In many cases, during installation the installer realizes that the edges are diverging and needs to make an adjustment. The misalignment in FIG. 10A has been exaggerated for illustration, with second pane 40b secured to the wall surface below line 42 but unengaged above line 42. In traditional graphic panels installed by wide area hook-loop mounting, attempting to adjust the second panel while the lower portion is engaged would cause local buckling or wrinkling of the panel surface, which is generally undesirable. To avoid such deformation, traditional adjustment would involve at least partially peeling the second panel from the wall surface and then reengaging the panel at a slightly adjusted rotation, often several times in order to get an acceptable alignment with no appreciable gap or overlap along the entire seam between adjacent panels (FIG. 10B). Stretching the second panel in order to help with alignment can cause an undesirable misalignment of the image features at the seam. This image misalignment can be evident in simple graphics, such as those shown in FIGS. 10A and 10B, and also in images featuring photograph, such as is represented in FIGS. 11A and 11B.

We have determined that installation alignment adjustability can be significantly improved by configuring the printed media so as to enable a very different alignment mode. To this end we have derived a parameter we call the Torsional Alignment Coefficient (TAC), which is the direct ratio of torsional rigidity of the printed media to the shear strength of the fastening, expressed as a dimensionless measure such as MPa/Mpa. We have determined, based on our understanding of the principles underlying this phenomenon and our work with various materials, that a TAC of greater than 5000, such as between 5000 and 15000, provides a desirable result. As a point of reference, the TAC of the examples of FIGS. 6A and 6B have a TAC of 9600 and 7800, respectively, when engaged with a wall surface covered with the hook material described above, and demonstrated improved torsional alignability as compared with example of FIG. 6C, which had a TAC of only 1900 when so engaged, and was less readily aligned. Referring back to FIGS. 10A and 10B, in the improved alignment mode, installation of the second panel 40b is initiated at an aligned corner, as before. But as soon as a misalignment is detected, rather than partially peeling panel 40b from the surface to correct alignment, the engaged region (e.g., under line 42) is rotated while engaged, through a motion that induces a shear slip in the fastening. By designing the panel itself with this alignment mode in view, as taught herein, such a torsional stress can be applied during installation with less chance of causing an unacceptable buckling of the panel surface.

The torsional rigidity (or torsional shear stiffness) of the printed media is determined by standard tensile testing, from the measured elastic modulus and Poisson's ratio, as calculated from the lateral necking occurring during the tensile test. For the standard tensile testing, 230×55 mm samples were conditioned for 24 hours at normal lab conditions (23° C. and 60% relative humidity). The test samples were clamped between the jaws of a tensile test machine and stressed in tension by separating the jaws at a constant rate of 50 millimeters per minute, up to an overall strain of about three percent, staying within the elastic regime of the material tested. The specific elastic tensile deformation is measured by a built-in extensometer of the tensile machine. While holding the sample at a known tensile deformation within the elastic range, the machine jaws are held fixed and the "necking" or transverse deformation of the width of the sample exactly half-way between the clamping jaws is measured with a precision Vernier caliper. From the known longitudinal and transverse elastic strains, Poisson's ratio and the torsional modulus are readily calculated by known methods.

In such a test, the material of FIG. 6A exhibited an elastic modulus of 129 MPa and a Poisson's ratio of 0.29, from which the torsional rigidity was calculated to be 83 MPa. Similarly, the material of FIG. 6B exhibited an elastic modulus of 398 MPa and a Poisson's ratio of 0.31, from which the torsional rigidity was calculated to be 260 MPa. The material of FIG. 6C exhibited an elastic modulus of 106 MPa and a Poisson's ratio of 0.29, from which the torsional rigidity was calculated to be 68 MPa.

Other factors should also be considered in the design of wide area hook-loop interfaces for flexible printed substrates, beyond the WPC and TAC characteristics discussed above. For example, for removal of an engaged flexible panel having width and length dimensions both in excess of one meter, the fastening should be designed to exhibit a peel resistance, measured as discussed above, of between about 0.15 and 0.3 N. A fastening within such a low range of peel may be obtained by generally reducing the engagement strength of typical hook-loop fastening systems, in ways generally understood.

For some applications, the entire wall surface will be covered with a dense array of touch fastener hooks extending from an impermeable membrane that may also act as a vapor barrier. The system may alternatively be configured for breathability, such as by providing holes through the touch fastener membrane, or configuring the touch fastener surface as an arrangement of discrete strips of hook material separated by gaps. The printed media for such applications may be fashioned to also be air-permeable while providing a printing surface capable of presenting a reasonably dense image.

Hook-loop engagement of printed media installed in public areas such as in stores may also help to prevent theft of such media, given that disengagement of the hook-loop interface generates a fair amount of noise.

While a number of examples have been described for illustration purposes, the foregoing description is not intended to limit the scope of the invention, which is defined by the scope of the appended claims. There are and will be other examples and modifications within the scope of the following claims.

What is claimed is:

1. A printed media display system, comprising
a media mounting surface carrying discrete male touch fastening elements arranged in a field extending across the surface, each male touch fastening element having a stem projecting outward and supporting a fiber-engageable head; and
print media in the form of a flexible sheet having a fastening side and a print side, the fastening side featuring engageable fibers in a fibrous field extending across a length and width of the flexible sheet, such that the fastening side of the print media is releasably engageable with the media mounting surface so as to display the print side;

wherein the media mounting surface and the fastening side of the print media together form a releasable fastening having a Peel Strength; and wherein the flexible sheet has a Bending Rigidity;

the Peel Strength and Bending Rigidity related such that the print media display system has a Wrinkle Propagation Coefficient of between 10 and 30.

2. The printed media display system of claim 1, wherein the print media exhibits a Small Deformation Shear Hysteresis of less than negative 40 grams force per centimeter.

3. The printed media display system of claim 1, wherein the print media exhibits a Wrinkle Propagation Coefficient of between 12 and 25.

4. The printed media display system of claim 3, wherein the print media exhibits a Wrinkle Propagation Coefficient of between 15 and 25.

5. The printed media display system of claim 3, wherein the Bending Rigidity of the flexible sheet is between 3.5 and 6 Newtons.

6. The printed media display system of claim 1, wherein the flexible sheet comprises a non-woven web forming the fibrous field.

7. The printed media display system of claim 6, wherein the non-woven web is partially embedded in a coating.

8. The printed media display system of claim 7, wherein the coating forms an ink-receptive outer surface of the print media.

9. The printed media display system of claim 8, further comprising ink printed on the outer surface of the print media.

10. The printed media display system of claim 6, wherein the non-woven web has an overall basis weight of less than about 120 grams per square meter.

11. The printed media display system of claim 1, wherein the male touch fastening elements are arranged with a density of between 200 and 400 elements per square centimeter across the field.

12. The printed media display system of claim 11, wherein the male touch fastening elements each extends to an overall height of between 0.3 and 0.7 millimeters from a surface interconnecting the touch fastening elements.

13. The printed media display system of claim 1, wherein the print media has an overall basis weight of less than about 600 grams per square meter.

14. The printed media display system of claim 13, wherein the print media has an overall basis weight of less than about 500 grams per square meter.

15. The printed media display system of claim 1, wherein the print side of the print media has a surface roughness of less than 4.0 µm.

16. The printed media display system of claim 1, wherein the print side of the print media has a surface roughness of less than 2.0 µm.

17. Print media in the form of a flexible sheet and comprising:

a textile fabric extending across a major dimension of the flexible sheet; and a continuous layer forming a coating on one side of the textile fabric, leaving fibers of an opposite side of the textile fabric exposed for releasable touch fastening engagement, the continuous layer underlying a printable surface of the print media on a side of the flexible sheet opposite the textile fabric;

wherein the flexible sheet is constructed so as to provide a peel strength when tested in accordance with ASTM D 5170-98 using HTH-830 as a hook surface; and wherein the flexible sheet has a Bending Rigidity so related to the peel strength that the print media display system has a Wrinkle Propagation Coefficient of between 10 and 30.

18. A printed media display system, comprising a media mounting surface carrying discrete male touch fastening elements arranged in a field extending across the surface, each male touch fastening element having a stem projecting outward and supporting a fiber-engageable head; and print media in the form of a flexible sheet having a fastening side and a print side, the fastening side featuring engageable fibers in a fibrous field extending across a length and width of the flexible sheet, such that the fastening side of the print media is releasably engageable with the media mounting surface so as to display the print side;

wherein the media mounting surface and the fastening side of the print media together form a releasable fastening having a Shear Strength; and wherein the flexible sheet has a Torsional Rigidity;

the Shear Strength and Torsional Rigidity related such that the print media display system has a Torsional Alignment Coefficient of at least 5000.

19. The printed media display system of claim 18, wherein the print media display system has a Torsional Alignment Coefficient between 5000 and 15000.

20. The printed media display system of claim 19, wherein the print media display system has a Torsional Alignment Coefficient between 6000 and 12000.

* * * * *